United States Patent [19]
Begle

[11] Patent Number: 5,001,557
[45] Date of Patent: Mar. 19, 1991

[54] METHOD OF, AND APPARATUS FOR, CONTROLLING THE POSITION OF AN AUTOMATICALLY OPERATED DOOR

[75] Inventor: Guntram Begle, Adligenswil, Switzerland

[73] Assignee: Inventio AG, Hergiswil, Switzerland

[21] Appl. No.: 360,039

[22] Filed: Jun. 1, 1989

[30] Foreign Application Priority Data

Jun. 3, 1988 [CH] Switzerland ........................ 2108/88

[51] Int. Cl.[5] ........................ H04N 5/33; H04N 7/18

[52] U.S. Cl. ........................ 358/113; 358/93; 250/221; 187/105; 187/132

[58] Field of Search ................ 358/107, 105, 113, 93, 358/1; 49/25, 31; 340/506; 187/103–105, 130–132; 250/221

[56] References Cited

U.S. PATENT DOCUMENTS

| | | | |
|---|---|---|---|
| 3,852,592 | 12/1974 | Scoville et al. | 250/221 |
| 4,520,343 | 5/1985 | Koh et al. | 187/105 |
| 4,554,459 | 11/1985 | Tsutsumi et al. | 250/221 |
| 4,555,724 | 11/1985 | Enriquez | 358/93 |
| 4,565,029 | 1/1986 | Kornbrekke et al. | 250/221 |
| 4,589,030 | 5/1986 | Kley . | |
| 4,823,010 | 4/1989 | Kornbrekke et al. | 49/25 |
| 4,874,063 | 10/1989 | Taylor | 187/131 |

FOREIGN PATENT DOCUMENTS

| | | |
|---|---|---|
| 3344576 | 6/1985 | Fed. Rep. of Germany . |
| 8603304 | 7/1986 | Fed. Rep. of Germany . |
| 8201454 | 4/1982 | PCT Int'l Appl. . |
| 607187 | 11/1978 | Switzerland . |
| 2093986 | 9/1982 | United Kingdom . |

*Primary Examiner*—Howard W. Britton
*Assistant Examiner*—Kim Yen Vu
*Attorney, Agent, or Firm*—Sandler, Greenblum & Bernstein

[57] ABSTRACT

The automatically operated door is controlled in dependence upon the presence and movement conditions of one or more persons present on a support surface within a predeterminate space on a predetermined side of the automatically operated door. A radiation source, particularly an infrared radiation source emits a radiation field along and at a predetermined height above the support surface so that the at least one person present on the support surface is irradiated and infrared reflections originate from the at least one irradiated person. The infrared reflection is received at an active imaging device such as, for example, an infrared camera. Such imaging device contains a liquid crystal display (LCD) unit with an associated microshutter and a linear image sensor arranged in a plane extending substantially parallel to the plane of the liquid crystal display unit. Data representative of the infrared reflection images are processed in a programmable evaluation and control unit with respect to the contour representative of the at least one person and with respect to temporal variations in the reflection images. The recognition capability of the apparatus can be improved by alternatingly producing optical reflection images and infrared reflection images.

28 Claims, 6 Drawing Sheets

METHOD OF, AND APPARATUS FOR, CONTROLLING THE POSITION OF AN AUTOMATICALLY OPERATED DOOR

BACKGROUND OF THE INVENTION

The present invention relates to a new and improved method of, and apparatus for, controlling the position of an automatically operated door as a function of the presence and movement conditions of at least one person present on a support surface within a predeterminate space extending on a predetermined side of the automatically operated door.

It is known in the art to utilize ultrasound, radar and video systems for such purpose. Radar systems as well as video systems are considered expensive and complicated and thus are believed to be inadequate for utilization in connection with the aforementioned door control function.

In an opto-electrical apparatus for monitoring predetermined spatial regions such as known, for example, from Swiss Patent No. 607,187, published on Nov. 30, 1978, there are provided an objective lens, a prismatic screen or grid which can be uni-axially or bi-axially displaced, groups of receivers or detectors and an evaluation circuit. The prismatic screen or grid constitutes a movable, location-related filter for alternatingly guiding light originating from points or limited areas of the object to be imaged or monitored, to the groups of receivers or detectors. Objects or persons entering the space which is swept or scanned by the monitoring or sensing apparatus affect the zero interference pattern which is generated in the absence of such objects or persons, and thereby cause a signal to appear above the zero level.

It is one disadvantage of such monitoring system that expensive optical components are required as well as mechanical drive means and difficult adjustments have to be carried out. Also, the proper function of such monitoring system is impaired by interfering influences of light.

In a similar lift or elevator control system such as known, for example, from British Published Patent Application No. 2,093,986, published on Sept. 8, 1982, there are also provided various optical components and an electronic evaluation circuit. One of the optical components constitutes a spatial filter which, in one illustrated embodiment, has a semi-spherical facetted or poly-face shape.

This lift or elevator control system operates in the spectral region of normal visible light so that spurious or interfering light influences cannot be precluded. Likewise, relatively expensive optical components are incorporated into the system and, due to mutually antagonistic requirements, such system cannot be adjusted in a simple manner.

SUMMARY OF THE INVENTION

Therefore with the foregoing in mind it is a primary object of the present invention to provide a new and improved method of, and apparatus for, controlling the position of an automatically operated door as a function of the presence, number and movement conditions of persons present on a support surface within a predeterminate space extending on a predetermined side of the automatically operated door and which method and apparatus are not afflicted with the drawbacks and shortcomings of the prior art.

Another and more specific object of the present invention is directed to the provision of a new and improved method of, and apparatus for, controlling the position of an automatically operated door as a function of the presence, number and movement conditions of one or more persons present on a support surface within a predeterminate space extending on a predetermined side of the automatically operated door, and which method and apparatus permit clearly and unambiguously recognizing the presence, the number and the movement conditions of the one or more persons.

A further significant object of the present invention is to provide a new and improved method of, and apparatus for, controlling the position of an automatically operated door as a function of the presence, number and movement conditions of one or more persons present on a support surface within a predeterminate space extending on a predetermined side of the automatically operated door and which method and apparatus provide a clear and unambiguous indication of the presence, the number and the movement conditions of the one or more persons and permit controlling the operation of the automatically operated door consistent with the indicated presence, number and movement conditions of the one or more persons.

A still further noteworthy object of the present invention aims at providing a new and improved apparatus for controlling the position of an automatically operated door of the type as described and which is relatively simple with respect to the mode of operation and construction thereof, can be relatively economically manufactured, is highly reliable in operation and not readily subject to malfunction or breakdown.

Now in order to implement these and still further objects of the invention, which will become more readily apparent as the description proceeds, the method of the present development is manifested, among other things, by the features that, infrared radiation is emitted into the predeterminate space and thereby at least one person is irradiated which is present on the support surface within the predeterminate space extending on the predetermined side of the automatically operated door. There is detected by means of an infrared imaging device, the reflected infrared radiation reflected by the at least one person present on the support surface within the predeterminate space and the detected reflected infrared radiation is evaluated by means of a programmable evaluation and control circuit for generating control signals for controlling the operation of the automatically operated door as a function of the presence, number and movement conditions of the at least one person present on the support surface within the predeterminate space.

As alluded to above, the invention is not only concerned with the aforementioned method aspects, but also relates to a new and improved construction of apparatus for carrying out the same. Generally speaking, the inventive apparatus comprises, among other things, means for controlling the position of an automatically operated door as a function of the presence, number and movement conditions of at least one person present on a support surface within a predeterminate space extending on a predetermined side of the automatically operated door.

To achieve the aforementioned measures, the inventive apparatus, in its more specific aspects, comprises:

an infrared radiation source for emitting infrared radiation into the predeterminate space;

an active infrared imaging device for imaging the at least one person present on the support surface within the predeterminate space on the predetermined side of the automatically operated door;

the infrared imaging device imaging the at least one person present within the predeterminate space by means of reflected infrared radiation originating from the at least one person present within the predeterminate space; and a programmable evaluation and control unit operatively connected to the infrared imaging device for generating control signals controlling the operation of the automatically operated door as a function of the presence, number and movement conditions of the at least one person present on the support surface within the predeterminate space.

Essential advantages which are achieved by the invention reside in the fact that, due to the combination and special arrangement of the components, which are basically known as such, there are obtained results which provide a wealth of information or data. Furthermore, usually undesired effects such as, for instance, image distortion are utilized in a very beneficial and surprising manner for accomplishing a more precise and, consequently, more reliable control of the door operation. The inventive method and apparatus achieve the aforementioned highly favorable results by processing only comparatively limited or small amounts of data. It is particularly advantageous in this respect that the inventive method and apparatus only require relatively small sections or regions of the persons or objects to be detected in order to undertake reliable conclusions with respect to the presence, number and movement conditions of such objects or persons within the predeterminate space under observation.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
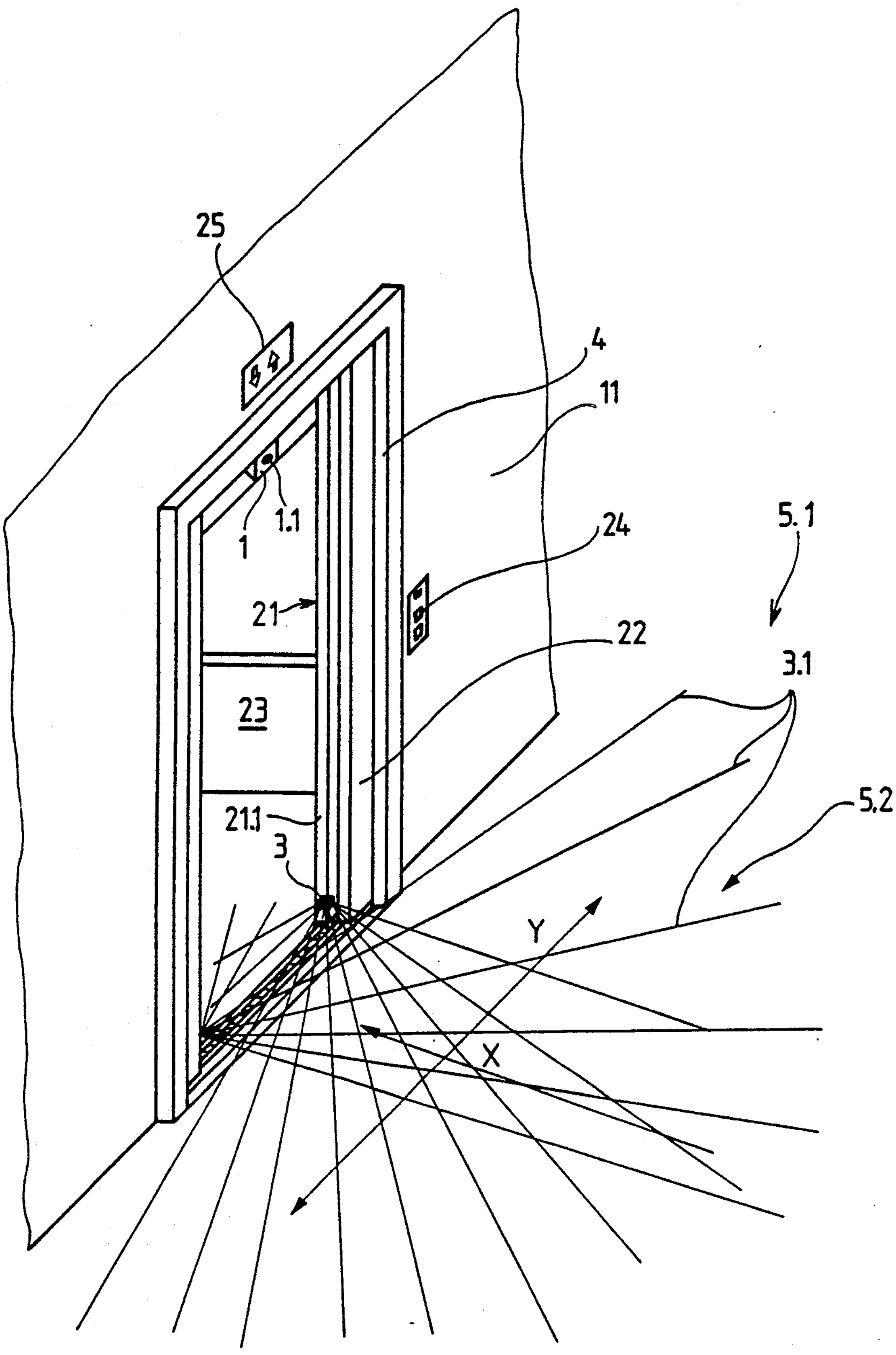
FIG. 1 is a perspective view of the overall installation of an exemplary embodiment of the inventive apparatus in connection with an elevator entrance.

Describing now the drawings, it is to be understood that to simplify the showing thereof, only enough of the apparatus has been illustrated therein as is needed to enable one skilled in the art to readily understand the underlying principles and concepts of this invention. Turning now specifically to FIG. 1 of the drawings, the installation illustrated therein by way of example and not limitation will be seen to comprise an elevator installation. There is illustrated an elevator front plane or upright surface 11 containing an elevator entrance 4 and an elevator cabin or car 23. An elevator hoistway door wing is designated by reference character 22 and an elevator cabin door and door wing are respectively designated by the reference characters 21 and 21.1. This elevator cabin or car door 21 constitutes the automatically operated door which is to be controlled by means of the inventive apparatus by carrying out the inventive method. A floor call panel 24 is arranged laterally of the elevator entrance 4 at the level of approximately half the height of the elevator cabin or car 23. A hall lantern 25 indicating the further travel direction of the elevator cabin or car 23 is arranged above the elevator entrance 4.

An imaging device such as, for example, an infrared camera 1 is installed in the cabin door header or lintel and such imaging device or infrared camera 1 contains an objective lens or lens system 1.1. Only one wing 21.1 of the elevator cabin or car door 21 is visible in the illustration of FIG. 1 and has a front marginal or edge region facing the other not particularly depicted elevator cabin or car door wing. A radiation source such as, for example, an infrared radiation source 3 is incorporated into the lower portion of this front marginal or edge portion of the elevator cabin or car door wing 21.1 and a similar radiation source 3 can be provided at the lower portion of the marginal edge of the other door wing.

Figure 2:
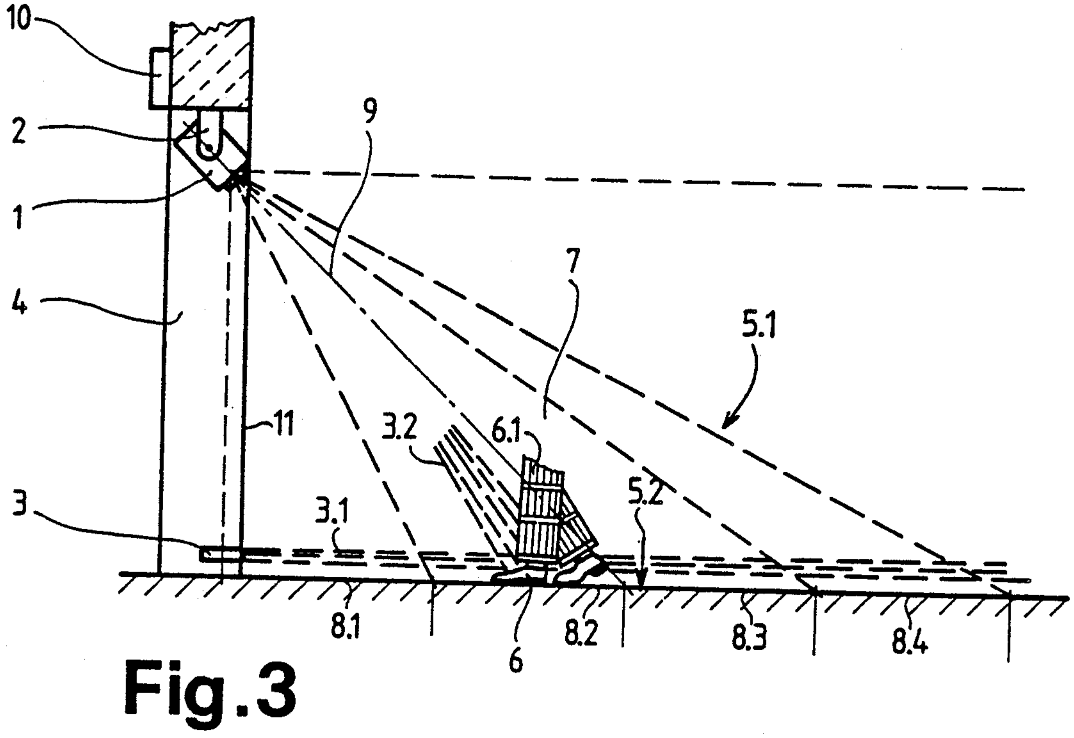
FIG. 2 is a side view of the installation as shown in FIG. 1.

In the illustrated example, the infrared radiation source 3 is selected or constructed such as to emit an infrared radiation field into a predeterminate space 5.1 which extends in the elevator vestibule or area in front of the elevator entrance 4 at the floor at which the elevator cabin or car 23 has stopped. The infrared radiation field 3.1 (FIG. 2) emitted by the infrared radiation source 3 has a comparatively limited vertical dimension and extends along and at a predetermined height above a support or vestibule surface 5.2 associated with the predeterminate space 5.1, as also illustrated in FIG. 2.

As further illustrated in the side view of FIG. 2, the imaging device or infrared camera 1 located above the elevator entrance 4 is mounted at a suitable camera support 2 and connected to a programmable evaluation and control unit 10 to be described more fully hereinafter. There are shown the feet 6 and legs 6.1 of a person 7 which is present on the support or vestibule surface 5.2 within the predeterminate space 5.1. As illustrated, the person 7 is moving in a direction towards the elevator front plane or upright surface 11. The line 9 indicates the camera axis and different zones 8.1, 8.2, 8.3 and 8.4, sometimes referred to as Y-zones, are also indicated which extend at or substantially parallel to the support or vestibule surface 5.2 in a direction substantially parallel to the wings 21.1 of the elevator cabin or car door 21 (see also FIG. 1).

Figure 3:
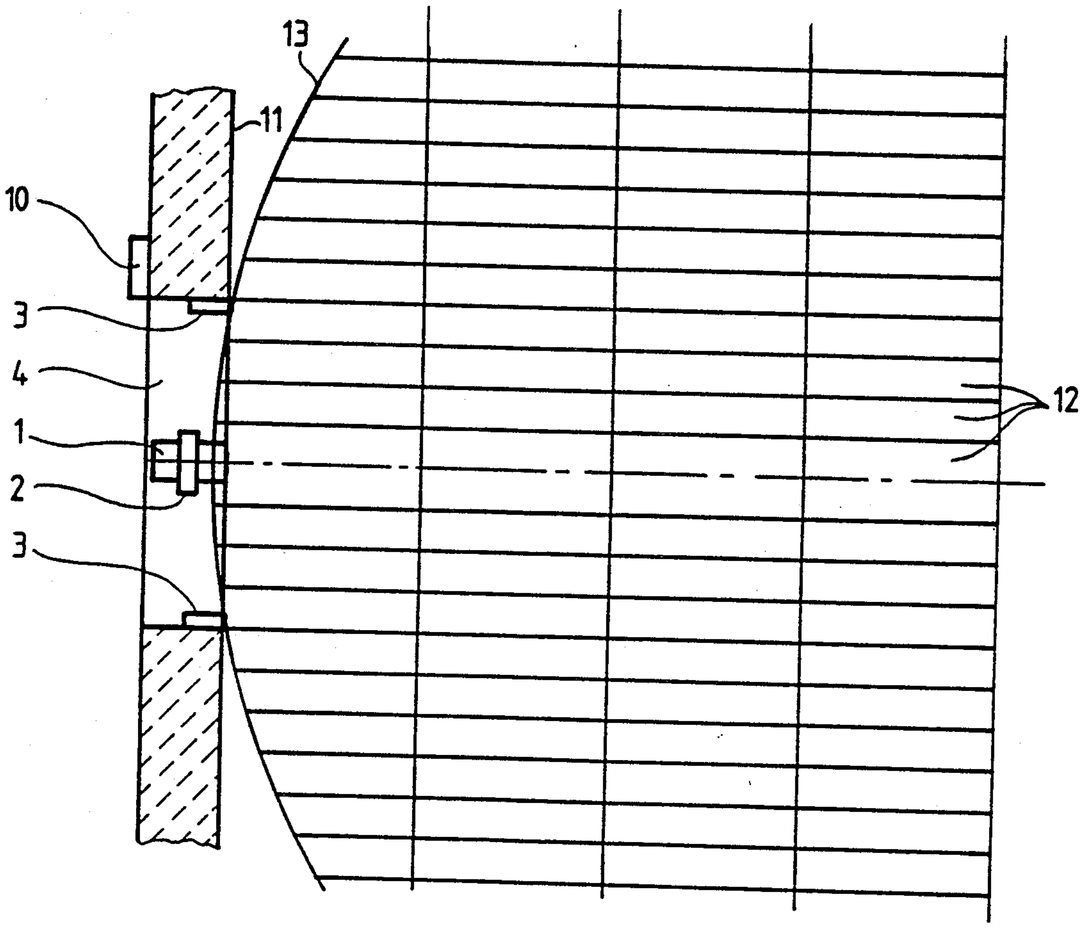
FIG. 3 is a top plan view of the installation as shown in FIG. 1.

In the top plan view of FIG. 3, there are also indicated the different Y-zones 8.1 to 8.4 as well as a further set of zones 12, sometimes referred to as X-zones, which extend at or substantially parallel to the support or vestibule surface 5.2 and substantially perpendicular to the wings 21.1 of the elevator cabin or car door 21. An image margin or boundary 13 is likewise indicated and designated by the reference character 13 in the region of the elevator front plane or upright surface 11. In the illustration of FIG. 3 and as previously noted, the direction of the zones 8.1 to 8.4 and the direction of the zones 12 are respectively conveniently designated as the Y-direction and X-direction.

Figure 4:
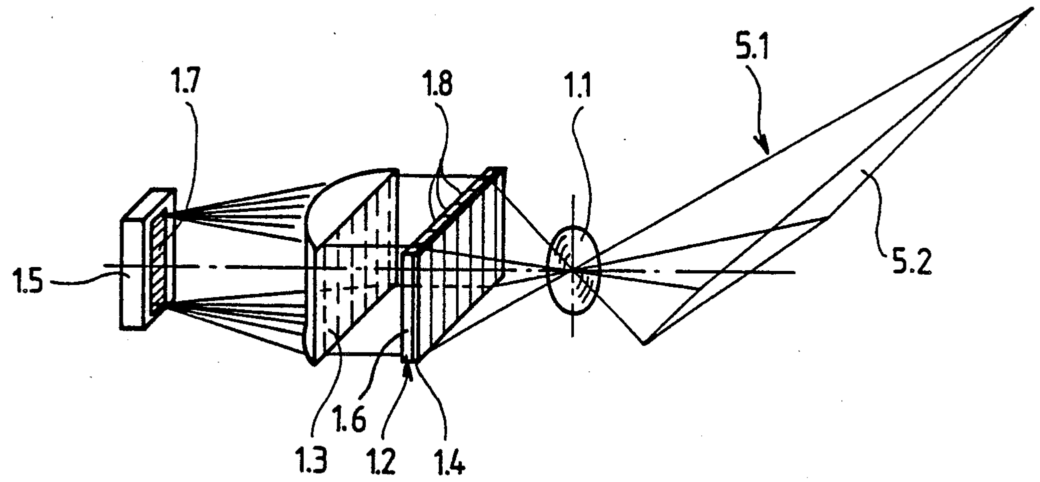
FIG. 4 is a schematic view in perspective of the components and their arrangement in an infrared camera of the inventive apparatus illustrated in FIG. 1.

FIG. 4 shows a schematic view in perspective of the components of the imaging device or infrared camera 1 in its relationship to the predeterminate space 5.1 and the support or vestibule surface 5.2. The imaging device or infrared camera 1 contains the aforementioned objective lens or lens system 1.1, a liquid crystal display unit (LCD) 1.2 comprising a liquid crystal display 1.6 in combination with a microshutter and an infrared filter 1.4. The microshutter which is associated with the liquid crystal display 1.6, contains microshutter columns 1.8 which are arranged parallel and adjacent to each other in a common plane, and receives a projected infrared reflection image of the person or persons located on the support or vestibule surface 5.2 within the predeterminate space 5.1 and which image is produced by the objective lens or lens system 1.1 of the imaging device or infrared camera 1. The microshutter columns 1.8 are arranged adjacent each other in a first direction corresponding to the aforementioned Y-direction (FIG. 3) which extends substantially parallel to the support or vestibule surface 5.2 and substantially parallel to the wings 21.1 of the automatically operated elevator cabin or car door 21. Each one of the microshutter columns 1.8 extends in a second direction which corresponds to the aforementioned X-direction (FIG. 3) extending substantially parallel to the support or vestibule surface 5.2 and substantially perpendicular to the automatically operated elevated cabin or car door 21. A linear image sensor 1.5 extends in a plane substantially parallel to the plane of the microshutter columns 1.8 and constitutes a charge coupled device (CCD) containing a predetermined number of sensor cells 1.7. The linear image sensor 1.5 likewise extends in the aforementioned second direction of the microshutter columns 1.8 and a cylinder lens 1.3 is arranged intermediate the liquid crystal display unit 1.2 and the linear image sensor 1.5 for imaging at the linear image sensor 1.5 the liquid crystal display sections which are exposed by appropriately operating or actuating individual ones of the microshutter columns 1.8.

Figure 5:
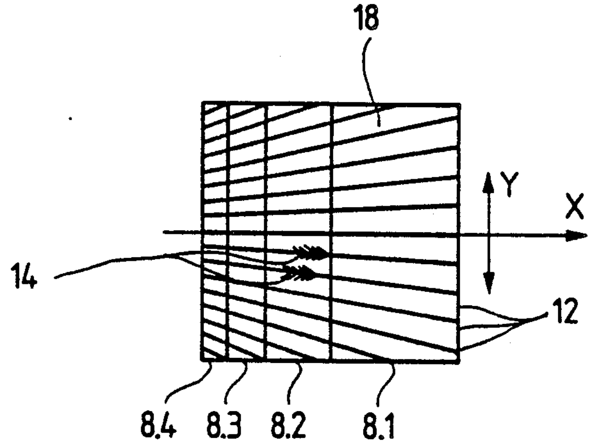
FIG. 5 is an illustration of the projected reflection image of a predeterminate space produced in the infrared camera as shown in FIG. 4.

FIG. 5 shows a projected reflection image 18 of the predeterminate space 5.1 which is imaged by means of the imaging device or infrared camera 1 through the objective lens or lens system 1.1 on the liquid crystal display unit 1.2. Due to the inclined position of the imaging device or infrared camera 1 relative to the support or vestibule surface 5.2, the reflection image projected onto the liquid crystal display unit 1.2 is distorted in both the aforementioned first and second directions with respect to the Y-direction and the X-direction in the plane of the support or vestibule surface 5.2. FIG. 5 indicates the reflected infrared reflection images 14 which originate from the infrared irradiated feet 6 and the legs 6.1 of the person present on the support or vestibule surface 5.2.

Figure 6:
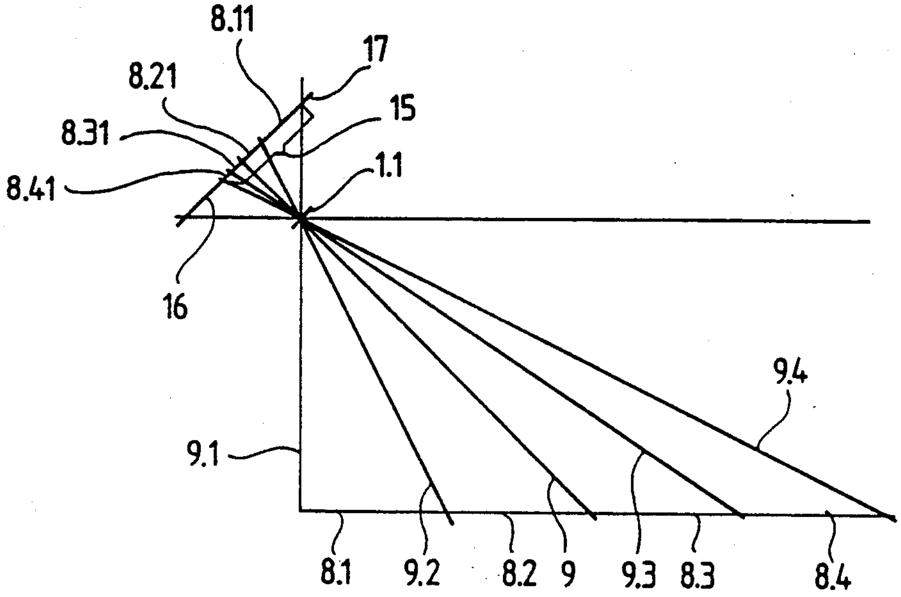
FIG. 6 is a diagram illustrating the imaging distortion or varying projection scale in the projected reflection image as shown in FIG. 5.

In the diagram of FIG. 6 there is schematically illustrated the cause of the distortion in the projected reflection image in a projection or imaging plane 17 relative to the plane of the support or vestibule surface 5.2. The camera axis 9 and rays 9.1 to 9.4 indicate the imaging process. The projection or imaging plane 17 is subdivided into a used region 15 and a non-used region 16. The used region 15 corresponds to the useful projection or imaging surface area defined by the liquid crystal display unit 1.2. In the projected reflection image on the liquid crystal display unit 1.2, the projection or image zones 8.11 to 8.41 in the projection plane 17 correspond to the Y-zones 8.1 to 8.4.

The aforedescribed apparatus operates in the following manner:

The infrared radiation emitted by the infrared radiation source 3 impinges, in the illustrated example, upon the feet 6 and the legs 6.1 of the person 7 which is present at the support or vestibule surface 5.2 within the predeterminate space 5.1. Part of the impinging infrared radiation is reflected towards the infrared imaging device or camera 1 which is provided with the aforementioned infrared filter 1.4. The infrared filter 1.4 is transparent only for such reflected infrared radiation. Consequently, only reflected infrared radiation passes through the infrared filter 1.4 and only the infrared reflection image 14 is projected through the objective lens or lens system 1.1 onto the liquid crystal display unit 1.2.

In an illustrative example, the liquid crystal display unit 1.2 contains a predetermined number of, for instance, fifty microshutter columns 1.8 which are individually controllable. During operation, the microshutter columns 1.8 are sequentially operated or actuated in accordance with a predetermined operation cycle. There is thus generated a correspondingly shaped slot-like transparent opening which is periodically passed across the liquid crystal display 1.6 in the aforementioned first direction, i.e. in a direction substantially transverse to the direction of extent of the individual microshutter columns 1.8. A very low scan rate can be selected for this scanning operation because it is not required to produce a non-flickering image for a viewer. For example, it is sufficient to generate a maximum of ten images per second whereby each image is understood to encompass an entire passage or pass across the liquid crystal display unit 1.2. This has the advantage that only very small amounts of data are produced which can be readily processed along with other data in a special or dedicated microprocessor or in a processor system which is already present for controlling the elevator operation.

The cylinder lens 1.3 focusses each one of the thus scanned columns of the liquid crystal display 1.6 onto the same line in the linear image sensor 1.5 which is continuously read out for each one of the projected image columns and prepared for the next-following image column. The read-out data are intermediately stored and processed in a manner which will be described in more detail hereinbelow. The linear image sensor 1.5 contains, for instance, at least 250 sensor cells 1.7. Since the liquid crystal display unit 1.2 contains, for example, a maximum of 50 microshutter columns 1.8, the resolution of the projected and scanned image in said second direction corresponding to the aforementioned X-direction with respect to the support or vestibule surface 5.2, is at least five times greater than the image resolution in the first direction corresponding to the aforementioned Y-direction with respect to the support or vestibule surface 5.2. This has the consequence that objects or persons 7 moving in the X-direction towards the elevator front plane 11 are detected at an image definition improved at least by a factor of 5 over objects or persons 7 which move in the Y-direction, i.e. in a direction substantially parallel to the elevator front plane 11 and to the support or vestibule surface 5.2.

Furthermore, the reflection images 14 of an object or person 7 moving in the Y-direction on the support or vestibule surface 5.2, is always projected onto substantially the same sensor cells 1.7 of the linear image sensor 1.5 which allows the unequivocal conclusion that the related object or person 7 is not approaching or moving towards the elevator entrance 4. The corresponding binary data representative of the respective infrared reflection image 14, when combined with the positions of the momentary opened microshutter columns 1.8, can be interpreted as the movement of a person 7 parallel to the elevator front plane 11 and the support or vestibule surface 5.2.

FIGS. 2 and 3 show a raster or grid of Y-zones 8.1 to 8.4 and X-zones 12 which respectively extend in the aforementioned Y-direction and X-direction. However, it should be noted that this raster or grid is not present in reality and merely serves the illustrative purpose of better explaining the image distortion and the effects resulting therefrom.

In accordance with the illustration of FIG. 5, the objective lens or lens system 1.1 of the imaging device or infrared camera 1 images, at the projection or imaging plane 17 in accordance with the laws of descriptive geometry or optical imaging, a Y-zone like, for example, the Y-zone 8.1 which is closer to the automatically operated elevator cabin or car door 21, at a greater scale than a more distant located Y-zone like, for example, the Y-zone 8.4. The same is also true for the X-zones 12. However, this is of less significance with respect to the Y-zones 8.1 to 8.4 because objects or persons 7 moving in the Y-direction, obviously do not intend to enter the elevator.

If it is assumed that the Y-zones 8.1 to 8.4 and the X-zones 12 would be painted as a raster or grid on the support or vestibule surface 5.2 and if it is further assumed that the infrared filter 1.4 is removed from the liquid crystal display unit 1.2, then, a raster or grid image in accordance with FIG. 5, i.e. an image in a vanishing point perspective would be formed on the projection or imaging plane 17 of the liquid crystal display unit 1.2. In correspondence with this perspective or distortion, the Y-zones 8.1 to 8.4 are projected onto the projection or imaging plane 17 as very differently broad or wide, distorted Y-zone images 8.11, 8.21, 8.31 and 8.41, respectively. It follows therefrom that the Y-zone 8.1 which is located close to the automatically operated elevator cabin or car door 21, is associated with a certain number of sensor cells 1.7 in the linear image sensor 1.5. Such number of sensor cells 1.7 is a multiple of the sensor cells 1.7 which is associated with the projected Y-zone image of the comparatively more distant Y-zone 8.4. The practical result or effect of such imaging distortion is that a person 7 moving in the X-direction at constant speed towards the elevator front plane 11, generates reflection images 14 which, due to the image distortion at the projection or imaging plane 17 and thus at the linear image sensor 1.5, appear at a speed which increases with decreasing spacing or distance from the elevator front plane 11 in a progressively increasing manner in accordance with the variation in the image distortion or distorting function. The detection system thus additionally possesses a distance-dependent sensitivity. Such distance-dependent sensitivity is also present, however, to a smaller degree with respect to object or person movements in the Y-direction.

In summary, it can therefore be stated that in addition to the increase of the image resolution by the factor of five in the X-direction relative to the Y-direction, there is obtained a progressively increasing image resolution or sensitivity which increases with decreasing distance from the elevator front plane 11. This is a highly desirable effect because the urgency of a rapid response of the automatically operated elevator cabin or car door 21 also progressively increases with decreasing distance of a person which approaches the elevator entrance 4.

As already explained hereinbefore, the infrared radiation source 3 emits an infrared radiation field 3.1 which extends along and at a predetermined height above the support or vestibule surface 5.2. Consequently, the emitted infrared radiation field 3.1 does not impinge upon the support or vestibule surface 5.2 and thus no interfering floor reflections occur due to floor irregularities like, for example, carpet edges and the like. The infrared radiation source 3 is constructed such as to emit an infrared radiation field of only limited vertical extension. In a practical example, the infrared radiation source has a horizontal angular emission range preferably of about 120° whereas the vertical angular emission range amounts to about 10°.

The floor call panel 24 shown in FIG. 1 may also contain a ten-key keyboard for the destination or target call control. In the presence of such installation, the central elevator control is informed about the number of waiting persons which are present at each floor. Therefore, it is not required to provide the vestibule monitoring system and the related devices outside the elevator cabin or car 23 at each floor.

The imaging device or infrared camera 1 located above the elevator entrance 4 is downwardly inclined, for example, at an angle of about 45° which also corresponds to the image projection angle. The camera support 2 is quite important in terms of adjusting, by means of such camera support 2, a predetermined inclination relative to the support or vestibule surface 5.2. This inclination directly determines the degree or extent of image distortion and also influences the size and position of the monitored portion of the support or vestibule surface 5.2. Particularly with regard to the last-mentioned factor, the inclination is selected such that no existing substantially vertical surfaces like, for example, the vertical surfaces of walls located opposite the elevator entrance 4, can be imaged.

Any objects or persons 7 which are impinged upon by the infrared radiation field 3.1 emitted by the infrared radiation source 3, reflect the infrared radiation as illustrated at 3.2 in FIG. 2 at correspondingly inclined surface portions entirely and partially conjointly with all other surface portions which face the infrared radiation field 3.1 at more or less perpendicular inclination. A partial reflection of the impinging infrared radiation field 3.1 by a person 7 from surface portions which extend more or less perpendicular to the infrared imaging device or camera 1 is possible because even the smallest irregularity of such surface portions causes scattering reflections. Consequently, the surface portions of an object or person 7 and which surface portions are located entirely within the infrared radiation field 3.1 and face such infrared radiation field 3.1, are distinctly imaged in the imaging device or infrared camera 1. With the exception of the reflected infrared radiation, no other radiation impinges upon the liquid crystal display unit 1.2 so that already at the start of the image processing operation, there are present only two image signals, namely reflected infrared radiation or no infrared radiation, i.e. binary image data. The sensitivity with respect to reflected infrared radiation, therefore, can be fixedly adjusted to a predetermined very low threshold value and in this respect due account is taken especially of the wavelength of the infrared radiation which is emitted by the infrared radiation source 3.

The evaluation or processing of the infrared reflection images 14 is carried out by means of a special programmable evaluation and control unit 10 or can also be assigned to a data processing system already present for the control of the elevator operation such as a microprocessor of the commercially available Motorola type 6800.

The programmable evaluation and control unit 10 is programmed by means of algorithms which are known as such and trigger in the presence of detected objects or persons in cooperation with the elevator control distinct logic movements of the automatically operated elevator cabin or car door 21.

Figure 7:
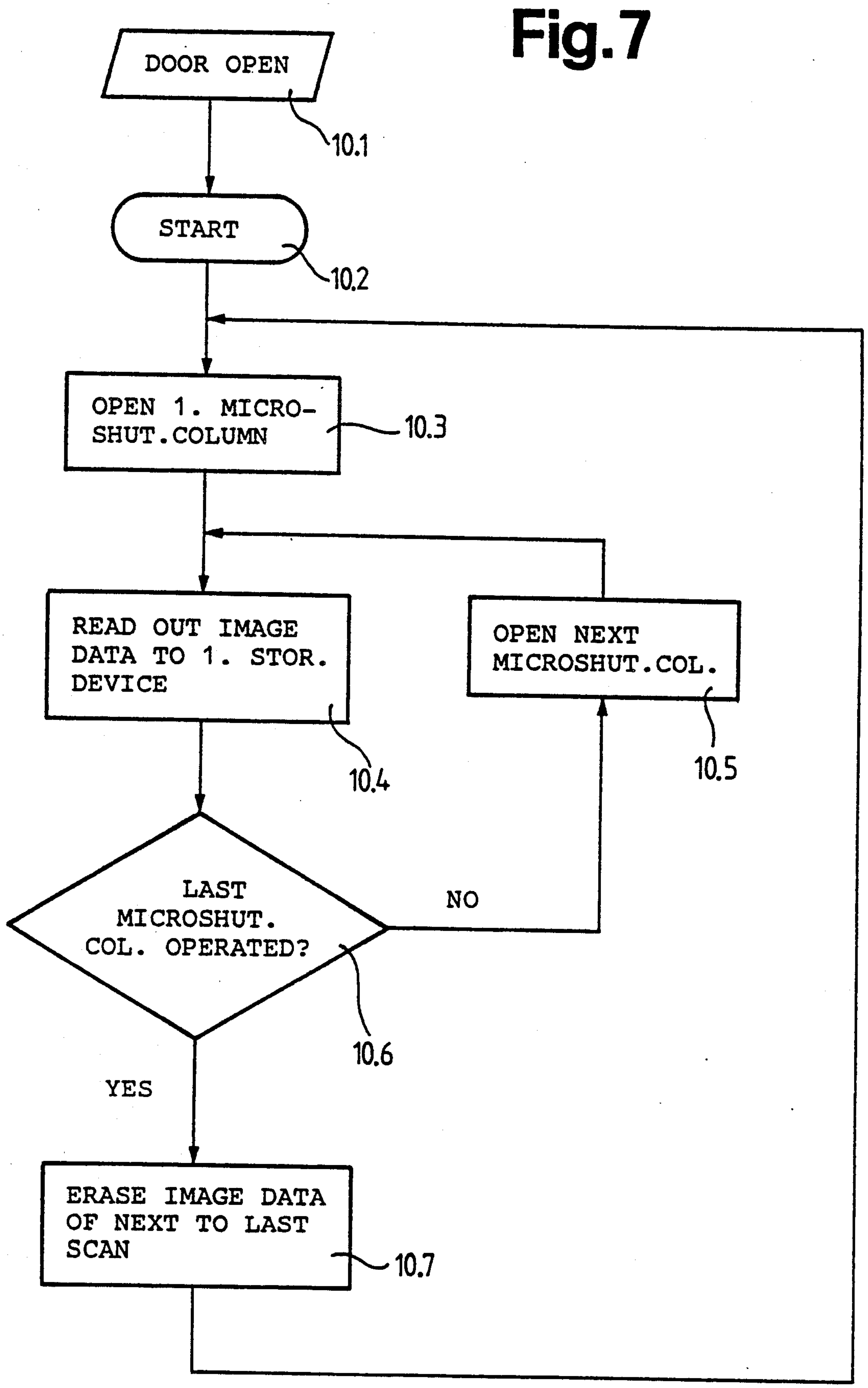
FIG. 7 is a flow chart showing the steps of the scanning operation for scanning the reflection image as shown in FIG. 5 by means of a programmable evaluation and control unit in the inventive apparatus as shown in FIG. 1.
Figure 9:
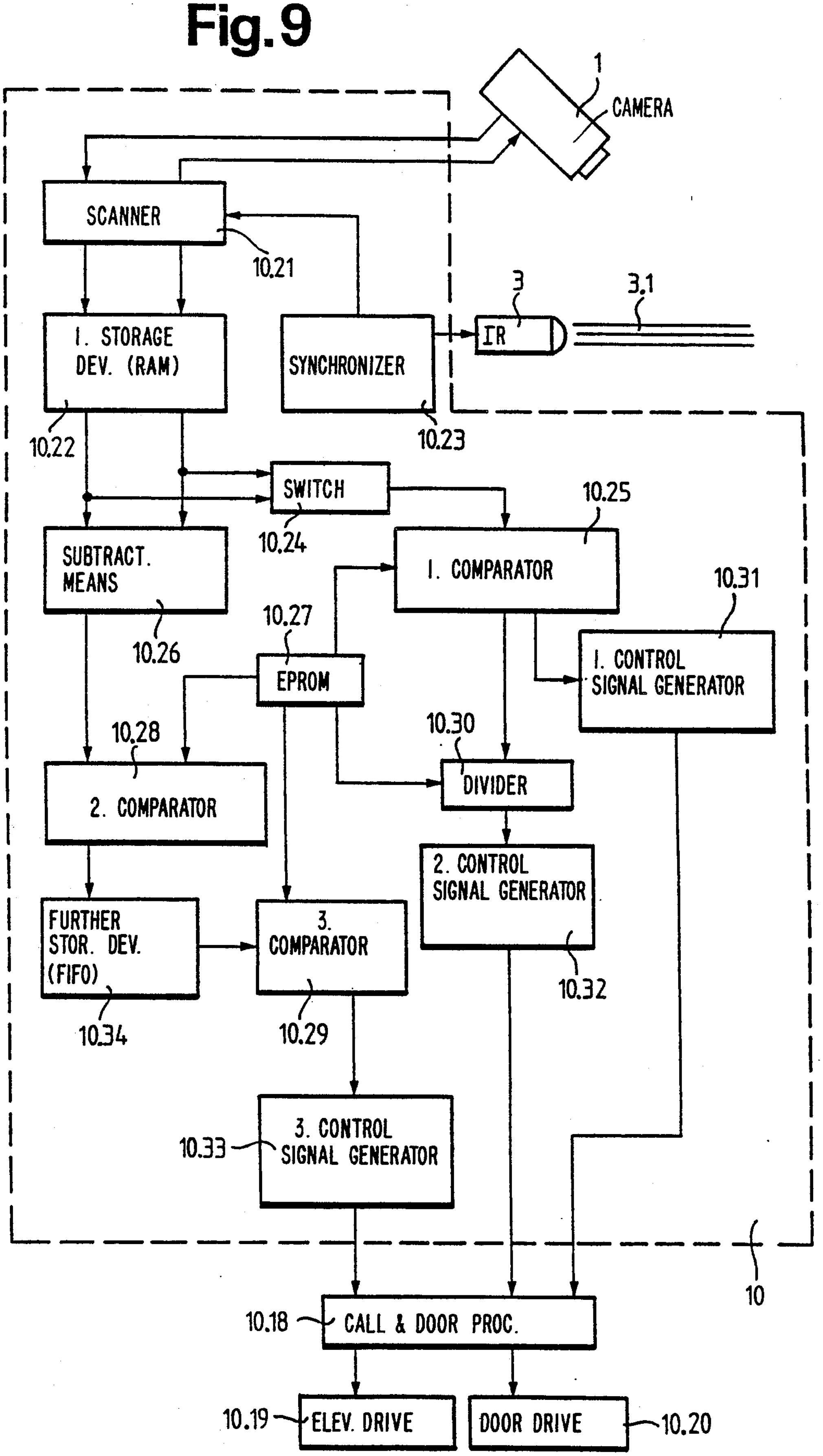
FIG. 9 is a schematic block circuit diagram of an exemplary embodiment of programmable evaluation and control unit in the inventive apparatus as shown in FIG. 1.

The flow chart illustrated in FIG. 7 explains the essential functions of the image scanning operation. When the elevator cabin or car door 21 is established to be in the open condition in step 10.1 of the operation, the data processing operation is started at the step 10.2. At the start of the processing operation, the first microshutter column 1.8 of the microshutter in the liquid crystal display unit 1.2 is operated or actuated. During the subsequent operational step 10.4 the image data of two consecutive reflection images are sequentially read-out from the linear image sensor 1.5 and conjointly stored in a first storage means or device such as, for example, a random access memory (RAM) 10.22 as illustrated in FIG. 9 of the drawings. At the end of the read-out operation, it is established during the operational step 10.6 whether the last microshutter column 1.8 of the liquid crystal display unit 1.2 has been operated or actuated. Depending upon the condition, there is either operated or actuated the next-following microshutter column 1.8 during the operational step 10.5 or the image data related to the next to last image are erased in the storage means during the operational step 10.7.

Figure 8:
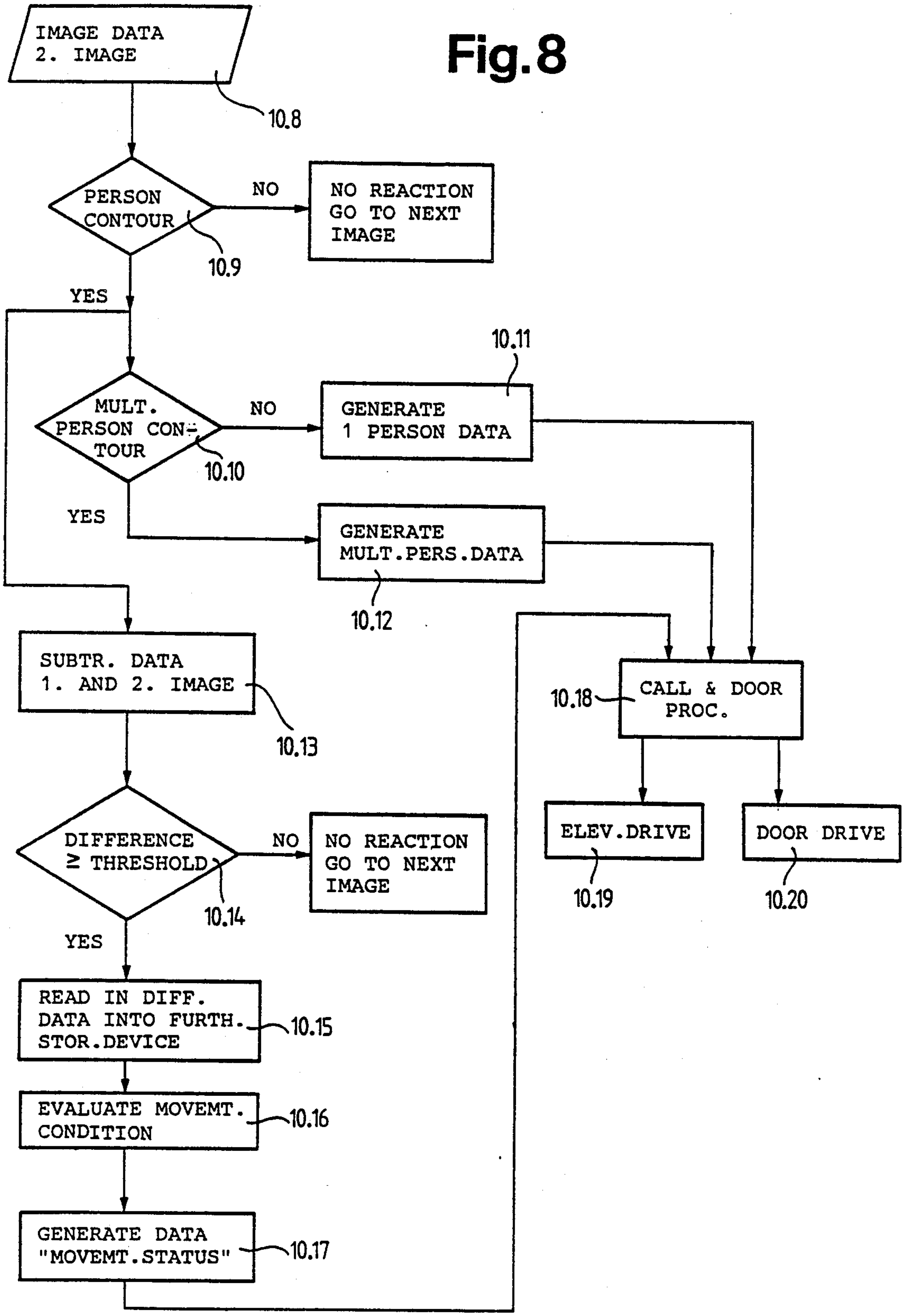
FIG. 8 is a flow chart showing the different processing steps during evaluation of the scanned data obtained from the reflection image as shown in FIG. 5 by means of the programmable evaluation and control unit of the inventive apparatus.

The flow chart shown in FIG. 8 illustrates the essential functions during the image data processing operation. It will be remembered that the binary data representative of two consecutive reflection images are stored in the first storage means or device 10.22 (FIG. 9). During the first step 10.8 of such image data processing operation, the second image or binary data which are obtained as the result of the second read-out operations on the linear image sensor 1.5 after operation or actuation of all microshutter columns 1.8 and which are representative of the second infrared reflection image, are compared with a given data pattern corresponding to an imaged contour of a person 7 during the operational step 10.9. In the event of conformity, the second image or binary data representative of the second infrared reflection image are subsequently compared with a given data pattern representative of a contour of more than one person during the operational step 10.10. In the event of non-conformity, there are generated data relating to the presence of one person on the support or vestibule surface 5.2 during the step 10.11 whereas, in the event of conformity, there are generated data relating to the presence of a multiple number of persons on the support or vestibule surface 5.2 during the operational step 10.12. The respective data resulting from the steps 10.11 and 10.12 are infed into a call and door processor 10.18.

During the operational step 10.13, the second image or binary data representative of the second infrared reflection image are compared with the first image or binary data representative of the first infrared reflection image. Specifically, this operational step 10.13 encompasses a subtraction of the two image or binary data in order to form differential image or binary data.

During the following operational step 10.14, the differential image or binary data are compared with a predetermined threshold value which can be obtained, for example, from an erasable and programmable read-only memory (EPROM) 10.27 as illustrated in FIG. 9 of the drawings. In the event that the predetermined threshold value is exceeded, the excess differential image or binary data are read into a further storage device during the operational step 10.15. Such further storage device may be constituted, for example, by a first-in, first-out or FIFO memory 10.34 as shown in FIG. 9 of the drawings. Such FIFO memory 10.34, for instance, may have a storage volume sufficient for storing ten sets of differential image or binary data. During the following operational step 10.16 the data present in the FIFO memory 10.34 are analyzed with respect to determining the type and direction of movement of the object or person detected on the support or vestibule surface 5.2. Thereafter, during the operational step 10.17, there are generated data which are indicative of the movement status or condition and infed to the aforementioned call and door processor 10.18. The call and door processor 10.18 generates logic control commands for the aforementioned elevator drive 10.19 or the door drive 10.20.

The aforedescribed comparison can also be utilized for updating standard image or binary data representative of standard reflection images. Such standard image or binary data are obtained from a preselected number of image or binary data which are representative of a given condition on the support or vestibule surface 5.2, in conventional manner and stored in the erasable programmable read-only memory 10.27 as shown in FIG. 9. During the updating operation, the momentary image or binary data and the standard image or binary data are subjected to a subtracting operation similar to the operational step 10.13 in FIG. 8. The thus obtained differential image or binary data, if desired, can be used for an updating operation on the standary image or binary data.

Generally, the image scanning and evaluating steps are similar in principle to those known from U.S. Pat. No. 4,589,030.

In contradistinction with conventional operations, the scanning operation on the projected infrared reflection image at the liquid crystal display unit 1.2 is carried out sequentially with respect to the microshutter columns 1.8. When using the inventive method, the information concerning the distance of the objects or persons 7 from the automatically operated elevator cabin or car door 21 can be read out in a relatively simple manner from the data sets associated with the individual microshutter columns 1.8. The determination of such distance as well as the detection of the temporal variations in the distance during the operational steps 10.16 and 10.17 shown in FIG. 8 is quite important in view of the fact that in such manner there can be recognized the detection of a person 7 who hurries to the elevator entrance 4. Consequently, the dwell time of the automatically operated elevator cabin or car door 21, i.e. the time period during which such door 21 is held open, can be correspondingly prolonged or a closing door may even be reversed.

After activation or opening of the last one of the microshutter columns 1.8, the image or binary data representative of the entire projected infrared reflection image are stored in the first storage means or device 10.22 as well as the image or binary data representative of the immediately preceding projected infrared reflection image as indicated by the operational steps 10.4 in FIG. 7 and 10.8 in FIG. 8. For storing the image or binary data of the projected infrared reflection images there is thus required a storage volume sufficient for, for example, two entire projected infrared reflection images. After each comparison of the image or binary data of two consecutive projected infrared reflection images during the step 10.13 in FIG. 8, the data of the immediately preceding projected infrared reflection image can be erased or overwritten with the image or binary data obtained during the next-following scanning operation.

As already explained hereinbefore, the data pattern which is required for recognizing the contour of a person, comprises a minimum amount of fictitious digital image or binary data which are coherent in the first and second directions respectively corresponding to the Y-direction and the X-direction with respect to the support or vestibule surface 5.2. If the amount of digital image or binary data which are coherent in the first and second directions, of a currently scanned projected infrared reflection image is equal to or greater than the amount of data of the given contour data pattern, the next-following comparison step 10.10 serves to determine whether there is present an integral multiple. If not, the data indicating "one person" are generated; if an integral multiple is present, the data "more than one person" is generated. Such information or data, for example, may constitute four-bit data sets.

The comparison of the image or binary data representative of two full projected infrared reflection images during the subtraction step 10.13 results in differential data which are compared with a predetermined threshold value during the operational step 10.14. In the case of equality or excess, the differential data are read into the further storage device or FIFO memory 10.34, as already explained hereinbefore. At a scanning rate of, for example, ten projected infrared reflection images per second, there is thus present in the FIFO memory 10.34 a digital "movement image" of the time period of one second. The logic interpretation of the "movement image" during the operational step 10.16 generates the data representative of the movement status or condition during the operational step 10.17 and these data essentially contain indications concerning the direction of movement. The data which are thus produced during the operational steps 10.11, 10.12 and 10.17, then, are infed to the call and door processor 10.18. Such call and door processor 10.18 processes the incoming data and draws logic conclusions enabling the following determinations:

(i) One person is moving in the X-direction on the support or vestibule surface 5.2.

(ii) Two or more persons are moving in the X-direction on the support or vestibule surface 5.2.

(iii) One person moves opposite to the X-direction on the support or vestibule surface 5.2.

(iv) Two or more persons are moving opposite to the X-direction on the support or vestibule surface 5.2.

(v) One person is standing at a certain distance from the automatically operated elevator cabin or car door 21.

(vi) Two or more persons are standing at certain distances from the automatically operated elevator cabin or car door 21.

(vii) One person is moving in the Y-direction on the support or vestibule surface 5.2.

(viii) Two or more persons are moving in the Y-direction on the support or vestibule surface 5.2.

In summary of the foregoing description, it can be stated that the car and door processor or control 10.18 is supplied with data concerning the presence, the number and the movement condition of at least one person which is present on the support or vestibule surface 5.2 at a given moment of time and also the intentions of such person or persons due to their behavior as apparent from the temporal variations in the infrared reflection images. The car and door processor or control 10.18 responds correspondingly by, for example, keeping open, premature closing, or reversing the motion of the automatically operated door. In most cases, the automatically operated elevator cabin or car door 21 can be prematurely closed prior to the expiration of the otherwise usual dwell time or time period for which the automatically operated elevator cabin or car door 21 is kept open, which results in an increase of the elevator passenger conveying capacity.

In the event of a fire at the floor in the region of the predeterminate space 5.1, the imaging device or infrared camera 1 images the infrared radiation produced by the fire on a large surface area of the liquid crystal display unit 1.2 and such event is recognized as a fire. In such case, the automatically operated elevator cabin or car door 21 immediately reverses into the closed position after partial opening.

The aforedescribed apparatus, furthermore, operates independently of light sources which may be present in the region and the environment of the support or vestibule surface 5.2. The predeterminate space 5.1 may be illuminated by artificial light of any kind, daylight, sunlight or mixed light. Eventual reflections of infrared radiation in the imaging or sensitivity region of the imaging device or infrared camera 1 and originating from artificial or natural light are possibly detected by the inventive apparatus but are also recognized as originating from such artificial or natural light sources during the data processing operation in the programmable evaluation and control unit 10. This is due to the fact that such artificial or natural light sources result in images which are incomparable to the projected infrared reflection images 14 which are typical of the objects or persons present on the support or vestibule surface 5.2 so that data corresponding to artificial or natural light sources are neglected during the data processing operation. This is rendered possible, among others, due to the fact that the images result from light sources emitting their respective light from a direction which is different from the emitting direction of the infrared radiation source 3.

In a further development of the inventive method there are alternatingly projected different reflection images, namely, in alternating fashion, an infrared reflection image and a reflection image in the absence of infrared radiation such as, for example, an optical reflection image. During processing of the image or binary data representative of the two different reflection images, the two sets of image or binary data are subtracted from each other and the differential image or binary data are subjected to further data processing. This procedure permits an even more enhanced differentiation between desired and undesired image elements contained in the projected reflection images. Also, the alternating projection of reflection images allows a pulsed operation of the infrared radiation source 3 and thus renders possible working at increased intensity of the infrared radiation field 3.1 emitted by the infrared radiation source 3.

A block circuit diagram of a programmable evaluation and control unit 10 used in the inventive apparatus is illustrated in FIG. 9. On its input side, the programmable evaluation and control unit 10 contains a synchronizer 10.23 which is connected to the infrared radiation source 3 and a scanner 10.21 which is operatively connected to the imaging device or infrared camera 1. The synchronizer 10.23 clocks and synchronizes the infrared radiation source 3 and the scanner 10.21 which governs the scanning operation carried out at the liquid crystal display unit 1.2 and the linear image sensor 1.5 of the imaging device or infrared camera 1. The scanner 10.21 is also connected to the first storage means or device 10.22 for storing the scanned data which are obtained as the result of the scanning operation by the scanner 10.21. In the illustrated example, the first storage means or device 10.22 constitutes a random access memory (RAM). As already explained hereinbefore with reference to the operational steps 10.8 and 10.13 in FIG. 8, the first storage means or device 10.22 has stored therein the binary data which are representative of the projected infrared reflection images projected by the imaging device or infrared camera 1, namely the infrared reflection image which has just been read-out from the linear image sensor 1.5 as well as the immediately preceding image which has been read-out from the linear image sensor 1.5 immediately prior to the first mentioned infrared reflection image.

For the evaluation of the stored infrared reflection images, the first storage device 10.22 is connected via switch means 10.24 to a first comparator 10.25 for carrying out the operating steps 10.9 to 10.12 shown in the flow chart of FIG. 8. For such comparison purpose, the programmable evaluation and control unit 10 contains an erasable and programmable read-only memory 10.27 which contains the aforementioned contour data patterns with respect to which the different comparisons are made. Thus, contour data are read-out from the erasable and programmable read-only memory 10.27 into the first comparator 10.25 for carrying out one of the comparison operations. As already explained hereinbefore with respect to the operational step 10.11 in FIG. 8, the comparison is first made in order to determine whether there is one person 7 or more than one person 7 present on the support or vestibule surface 5.2. In the presence of only one person 7, corresponding data are supplied to a first control signal generator 10.31 which is connected to the aforementioned call and door processor 10.18 in order to signal thereto the presence of one person 7.

The first comparator 10.25 is also connected on its output side to a divider 10.30 which, in turn, is connected to the erasable and programmable read-only memory 10.27 for receiving therefrom the aforementioned contour data patterns. The number of active data originating from the first comparator 10.25, then, is divided by the number of active data representative of the contour data patterns and obtained from the erasable and programmable read-only memory 10.27. The division result is representative of the number of persons present on the support or vestibule surface 5.2. Only the integral number of the result is evaluated as the number of detected persons 7. The divider 10.30 is connected on its output side to a second control signal generator 10.32 which converts the integral number of the division result into, for instance, a four-bit digital signal. The second control signal generator 10.32 is connected to the call and door processor 10.18 which receives the output signal of the second control signal generator 10.32 for further processing.

The programmable evaluation and control unit 10, furthermore, contains the elements required for carrying out the further comparison operations which are shown in FIG. 8 as the operational steps 10.13 to 10.17. Specifically, the first storage means or device 10.22 is connected to subtraction means 10.26 which also may constitute, for example, comparator means. The subtraction means 10.26, as shown by the steps 10.13 and 10.14, subtracts the aforementioned image or binary data which are stored in the first storage means or device 10.22 and which are representative of two consecutive projected infrared reflection images which have been read-out from the linear image sensor 1.5 of the imaging device or infrared camera 1. The subtraction means 10.26 is followed by a second comparator 10.28 which is also connected on its input side to the aforementioned erasable and programmable read-only memory 10.27 which contains data representative of threshold values related to the movement conditions of the person or persons 7 which are present on the support or vestibule surface 5.2. The second comparator 10.28 compares the differential image or binary data determined by the subtraction means 10.26 with the threshold values obtained from the erasable and programmable read-only memory 10.27. If the differential image or binary data are greater than the threshold value, the excess data are delivered to a further storage device 10.34 which is connected to the output of the second comparator 10.28. In the illustrated example, the further storage device 10.34 constitutes a first-in, first-out storage means or FIFO memory storing, for example, the preceding ten sets of differential image or binary data.

On its output side, the further storage device or FIFO memory 10.34 is connected to a third comparator 10.29 which is also connected to the electronically programmable read-only memory 10.27 on its input side. The third comparator 10.29 receives data patterns representative of the movement conditions of the person or persons 7 which are present on the support or vestibule surface 5.2 and compares the content of the further storage device 10.34 with such data patterns likewise obtained from the erasable and programmable read-only memory 10.27. As already described hereinbefore with respect to the operational step 10.16 in the flow chart of FIG. 8, the differential image or binary data stored in the further storage device or FIFO memory 10.34 correspond to, for example, 10 projected infrared reflected images which are obtained within a time period of one second. Consequently, the third comparator 10.29 compares the stored movement-related data pattern received from the erasable and programmable read-only memory 10.27 which is also related to a time period of one second, with the movement-related data obtained from the further storage device 10.34.

The third comparator 10.29 is connected on its output side to a third control signal generator 10.33 which generates a control signal in correspondence with the result of the comparison obtained in the third comparator 10.29. Such control signal may also constitute, for instance, a four-bit digital signal. The third control signal generator 10.33 is also connected to the call and door processor 10.18. Such call and door processor 10.28 receives the output signals of the aforementioned control signal generators 10.31, 10.32 and 10.33 which indicate to the call and door processor 10.18 the presence, the number and the movement conditions of at least one person 7 present on the support or vestibule surface 5.2. The call and door processor 10.18, as shown in FIG. 9, is connected, on its output side, to the elevator drive 10.19 and to the door drive 10.20 in order to carry out the commands delivered by the call and door processor 10.18 in accordance with the control signals received thereat.

In the foregoing, the inventive method and apparatus have been described with reference to the operation of an automatically operated door constituting an elevator cabin or car door 21. However, it will be apparent that the inventive method and apparatus is not limited to such specific example of an automatically operated door. Thus, the inventive method and apparatus can also be utilized on both sides of any entrance door or throughpassage door and thus can be employed in a dual installation. Also, it is possible in such event by correspondingly affecting the door drive 10.20 to ensure that persons selectively can only either enter or exit through a given door. Also, such automatically operated door can also be used for counting the number of entering and/or exiting persons. Furthermore, and importantly, the aforedescribed inventive automatic door operating method and apparatus can also be installed with respect to automatically operated doors of rail-bound vehicles or road-bound vehicles and also in such cases serves for an optimum control of the automatically operated door. Another field of application of the inventive monitoring method and apparatus concerns the detection and recordal of the behavior or movements of persons which are present within a predeterminate space to be monitored or on a surface which is to be monitored.

In the event of extended widths of the entrance or throughpassage, two or more of the inventive systems of the type as described hereinbefore can be installed in juxtaposition with respect to each other. In such extended systems, the infrared radiation sources 3 can be laterally located as illustrated in FIG. 1 of the drawings and additionally required infrared radiation sources can be installed, for example, in a door threshold of low height or may even be sunk into the floor.

In practice, the infrared radiation source or sources 3 can be arranged at any desired height above the floor or support surface of the predeterminate space to be monitored.

The inventive apparatus as illustrated by the block circuit diagram of FIG. 9 can also be realized, as already mentioned hereinbefore, by a correspondingly programmed microprocessor of conventional type and, if desired, can also be realized by correspondingly programming the microprocessor of the already present elevator control.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method of controlling the position of an automatically operated door as a function of the presence, number and movement condition of at least one person present on a support surface within a predeterminate space extending on a predetermined side of said automatically operated door, said method comprising the steps of:

emitting an infrared radiation field into the predeterminate space substantially along and above the support surface and thereby irradiating at least one person present on the support surface within the predeterminate space extending on the predetermined side of the automatically operated door;

arranging an infrared camera at a predeterminate height above said infrared radiation field and directing said infrared camera at a predeterminate inclination different from 90° to said infrared radiation field;

imaging, by means of said infrared camera and in the form of a plural number of infrared reflection images, at least part of the at least one person by reflected infrared radiation reflected in the presence of at least said part of the at least one person in said predeterminate imaging region of said predeterminate space;

evaluating, by means of a programmable evaluation and control unit, said plural number of infrared reflection images of at least said part of the at least one person and thereby detecting the presence of the at least one person on said support surface within said predeterminate space;

during said step of evaluating said plural number of infrared reflection images of at least said part of the at least one person, evaluating said plural number of infrared reflection images with respect to determining the number of the at least one person and with respect to determining the movement condition of the at least one person present on said support surface within said predeterminate space; and generating, by means of said evaluation and control unit, control signals for controlling the operation of the automatically operated door as a function of the evaluating operation on said plural number of infrared reflection images with respect to detecting the presence and determining the number and movement condition of the at least one person present on said support surface within said predeterminate space.

2. The method as defined in claim 1, wherein:

said step of emitting said infrared radiation field into said predeterminate space entails generating said infrared radiation field at said automatically operated door;

said step of imaging at least said part of the at least one person present in said predeterminate imaging region by means of said infrared camera entails producing said plural number of infrared reflection images which are representative of at least said part of the at least one person and originate from surface portions of at least said part of the at least one person facing said infrared radiation field and irradiated by said infrared radiation field; and said step of evaluating said plural number of infrared reflection images entails storing and evaluating said plural number of infrared reflection images with respect to contours representative of the at least one person and with respect to temporal variations representative of the movement condition of the at least one person present on said support surface within said predeterminate space.

3. The method as defined in claim 2, wherein:

said step of arranging said infrared camera, entails adjusting said infrared camera relative to said predeterminate imaging region in order to thereby exclude from the imaging operation reflected infrared radiation originating from distant substantially vertically extending surfaces located outside of said predeterminate imaging region imaged by said infrared camera.

4. A method of controlling the position of an automatically operated door as a function of the presence, number and movement condition of at least one person present on a support surface within a predeterminate space extending on a predetermined side of said automatically operated door, said method comprising the steps of:

emitting infrared radiation into the predeterminate space and thereby irradiating at least one person present on the support surface within the predeterminate space extending on the predetermined side of the automatically operated door;

detecting by means of an infrared camera infrared radiation reflected by the at least one person present on said support surface within said predeterminate space;

evaluating the detected reflected infrared radiation by means of a programmable evaluation and control unit for generating control signals for controlling the operation of said automatically operated door as a function of the presence, number and movement condition of the at least one person present on said support surface within said predeterminate space;

said step of detecting said reflected infrared radiation by means of said infrared camera entails adjusting said infrared camera to a predetermined position in which the camera axis extends at a predetermined angle different from 90° relative to said support surface within said predeterminate space;

said step of detecting by means of said infrared camera reflected infrared radiation further entails projecting at least one infrared reflection image of said predeterminate space; and during said step of projecting said at least one infrared reflection image, imaging different zones of said predeterminate space and which zones extend substantially parallel to said support surface and said automatically operated door in a manner such that a zone which is closer to said automatically operated door, is imaged at a larger scale than a zone which is more distant from said automatically operated door, and the imaging scale progressively increases with decreasing distance from said automatically operated door so that each zone situated closer to said automatically operated door is imaged at proportionally higher resolution as compared to an adjacent zone which is more distant from said automatically operated door.

5. A method of controlling the position of an automatically operated door as a function of the presence, number and movement condition of at least one person present on a support surface within a predeterminate space extending on a predetermined side of said automatically operated door, said method comprising the steps of:

emitting infrared radiation into the predeterminate space and thereby irradiating at least one person present on the support surface within the predeterminate space extending on the predetermined side of the automatically operated door;

detecting by means of an infrared camera infrared radiation reflected by the at least one person present on said support surface within said predeterminate space;

evaluating the detected reflected infrared radiation by means of a programmable evaluation and control unit for generating control signals for controlling the operation of said automatically operated door as a function of the presence, number and movement condition of the at least one person present on said support surface within said predeterminate space;

said step of detecting said reflected infrared radiation by means of said infrared camera entails projecting at least one infrared reflection image of said predeterminate space;

scanning said at least one projected infrared reflection image in two mutually perpendicular directions corresponding to respective directions extending in said support surface within said predeterminate space substantially parallel to said automatically operated door and substantially perpendicular to said automatically operated door;

said scanning operation including the following steps:

sequentially scanning said infrared reflection image in a first one of said two mutually perpendicular directions by means of a predetermined number of image columns which are arranged in sequence in said first direction corresponding to said direction extending substantially parallel to said automatically operated door, and extending in a second one of said two mutually perpendicular directions corresponding to said direction extending substantially perpendicular to said automatically operated door;

sequentially projecting each one of said sequence of image columns onto a linear image sensor extending in said second direction; and after each projecting step, reading-out said linear image sensor and preparing said linear image sensor for receiving the projection from a next-following one of said sequence of imaging columns.

6. The method as defined in claim 5, further including the step of:

selecting as said linear image sensor, a charge-coupled device having a higher resolution in said second direction as compared to the resolution of said image columns in said second direction.

7. A method of controlling the position of an automatically operated door as a function of the presence, number and movement condition of at least one person present on a support surface within a predeterminate space extending on a predetermined side of said automatically operated door, said method comprising the steps of:

emitting infrared radiation into the predeterminate space and thereby irradiating at least one person present on the support surface within the predeterminate space extending on the predetermined side of the automatically operated door;

detecting by means of an infrared camera infrared radiation reflected by the at least one person present on said support surface within said predeterminate space;

evaluating the detected reflected infrared radiation by means of a programmable evaluation and control unit for generating control signals for controlling the operation of said automatically operated door as a function of the presence, number and movement condition of the at least one person present on said support surface within said predeterminate space;

said step of detecting said reflected infrared radiation by means of said infrared camera entails projecting a plural number of infrared reflection images of said predeterminate space;

converting each one of said plural number of projected infrared reflection images into binary data representative of said infrared image and indicating a contour in said infrared reflection image as well as a temporal variation in said infrared reflection images as compared to at least one further infrared reflection image of said plural number of infrared reflection images;

storing each one of said binary data representative of each one of said infrared reflection images; and during said step of evaluation said detected reflected infrared radiation, comparing said stored binary data representative of the plural number of infrared reflection images with further projected infrared reflection images.

8. The method as defined in claim 7, further including the steps of:

comparing the binary data representative of different infrared reflection images and thereby forming standard binary data representative of standard infrared reflection images;

updating the standard binary data representative of the standard infrared reflection images by comparison with further binary data representative of at least one further infrared reflection image; and storing said updated binary data representative of said updated standard infrared reflection image for comparison with further projected infrared reflection images during said step of evaluating the detected reflected infrared radiation.

9. The method as defined in claim 1, further including the steps of:

imaging, in the form of optical reflection images and in the absence of said infrared radiation field, at least said part of the at least one person present in said predeterminate imaging region of said predeterminate space;

alternatingly forming said optical reflection images and said plural number of infrared reflection images; and during said steps of evaluating said plural number of infrared reflection images and generating said control signals, evaluating said optical reflection images conjointly with said plural number of infrared reflection images for generating the control signals for controlling the operation of said automatically operated doors.

10. A method of controlling the position of an automatically operated door as a function of the presence, number and movement condition of at least one person present on a support surface within a predeterminate space extending on a predetermined side of said automatically operated door, said method comprising the steps of:

emitting infrared radiation into the predeterminate space and thereby irradiating at least one person present on the support surface within the predeterminate space extending on the predetermined side of the automatically operated door;

detecting by means of an infrared camera infrared radiation reflected by the at least one person present on said support surface within said predeterminate space;

evaluating the detected reflected infrared radiation by means of a programmable evaluation and control unit for generating control signals for controlling the operation of said automatically operated door as a function of the presence, number and movement condition of the at least one person present on said support surface within said predeterminate space;

detecting reflected optical radiation reflected by the at least one person present of the support surface within said predeterminate space and forming an optical reflection image of said predeterminate space;

during said step of detecting said reflected infrared radiation by means of said infrared camera, projecting an infrared reflected image of said predeterminate space;

alternatingly forming said optical reflection image and said infrared reflection image;

converting said optical reflection image into binary data representative of said optical reflection image;

converting said infrared reflection into binary data representative of said infrared reflection image; and subtracting said binary data representative of said optical reflection image from said binary data representative of said infrared reflection image in order to thereby form differential binary data representative of a differential reflection image.

11. The method as defined in claim 7, further including the steps of:

comparing the binary data representative of different infrared reflection images and thereby forming differential binary data representative of differential infrared reflection images;

storing said differential binary data representative of the differential infrared reflection images; and during said step of evaluating the detected reflected infrared radiation comparing the binary data of further projected infrared reflected images with said stored differential binary data representative of said differential infrared reflection images with respect to the contour of said further projected infrared reflection images as well as with respect to temporal variations in said further infrared reflection images relative to said differential infrared reflection images.

12. The method as defined in claim 1, wherein:

said step of generating said control signals for controlling the operation of said automatically operated door entails generating control signals for selectively carrying out either one of the operations of stopping the door movement, reversing the door movement, opening the door, and closing the door.

13. A method of controlling the position of an automatically operated door as a function of the presence, number and movement condition of at least one person present on a support surface within a predeterminate space extending on a predetermined side of said automatically operated door, said method comprising the steps of:

emitting a radiation field of limited vertical extent into the predeterminate space along and at a predeterminate height above the support surface within the predeterminate space extending on the predetermined side of the automatically operated door;

arranging an active imaging device at a predeterminate height above said radiation field and directing said active imaging device at a predeterminate angle of inclination different from 90° to said radiation field;

imaging by means of said active imaging device and in the form of reflection images, at the least part of the at least one person by reflected radiation reflected by at least said part of said at least one person present within a predeterminate imaging region of said predeterminate space;

evaluating, by means of a programmable evaluation and control unit, said reflection images of at least said part of the at least one person present on said support surface within said predeterminate space; and generating control signals for controlling the operation of said automatically operated door as a function of the presence, number and movement condition of the at least one person present on said support surface within said predeterminate space as determined by evaluating said reflection images.

14. An apparatus for controlling the position of an automatically operated door as a function of the presence, number and movement condition of at least one person present on a support surface within a predeterminate space extending on a predetermined side of the automatically operated door, said apparatus comprising:

an infrared radiation source emitting an infrared radiation into said predeterminate space substantially along and above the support surface;

an active infrared imaging device directed to a predeterminate imaging region of said predeterminate space on the predetermined side of the automatically operated door;

support means for mounting said active infrared imaging device at a predeterminate height above said infrared radiation field and at a predeterminate angle of inclination different from 90° to said infrared radiation field;

said active infrared imaging device imaging in the form of infrared reflection images, at least part of the at least one person present within said predeterminate imaging region of said predeterminate space by means of reflected infrared radiation reflected by at least said part of the at least one person present on said support surface within said predeterminate space;

a programmable evaluation and control unit operatively connected to said active infrared imaging device for evaluating said reflection images of at least said part of the at least one person present in said predeterminate imaging region and thereby detecting the presence of said at least one person on said support surface within said predeterminate space;

said programmable evaluation and control unit being programmed for evaluating said infrared reflection images of at least said part of the at least one person present within said predeterminate imaging region of said predeterminate space with respect to determining the number and the movement condition of the at least one person present on said support surface within said predeterminate space; and said programmable evaluation and control unit generating control signals for controlling the operation of the automatically operated door as a function of the infrared reflection image evaluation with respect to detecting the presence and determining the number and movement condition of the at least one person on said support surface within said predeterminate space.

15. The apparatus as defined in claim 14, wherein:

said infrared radiation source is incorporated into said automatically operated door and generates, as said infrared radiation field, an infrared radiation field having limited vertical extent and extending along and at a predetermined height above said support surface for irradiating, as at least said part of the at least one person, only a predetermined fraction of a vertical extent of said at least one person present within said predeterminate imaging region of said predeterminate space;

said active infrared imaging device constituting an infrared camera producing a plural number of said infrared reflection images which are representative of at least said part of the at least one person and originate from at least said part of the at least one person at surface portions thereof facing said infrared radiation field and irradiated by said infrared radiation field; and said programmable evaluation and control unit containing means for storing and analyzing said plural number of infrared reflection images with respect to contours representative of the at least one person and with respect to temporal variations representative of the movement condition of the at least one person present on said support surface within said predeterminate space.

16. The apparatus as defined in claim 15, wherein:

said infrared camera imaging said predeterminate imaging region in order to reliably exclude the reception of reflected infrared radiation which is reflected by substantially vertically extending surfaces located outside of said predeterminate imaging region imaged by said infrared camera.

17. An apparatus for controlling the position of an automatically operated door as a function of the presence, number and movement condition of at least one person present on a support surface within a predeterminate space extending n a predetermined side of the automatically operated door, said apparatus comprising:

an infrared radiation source incorporated into the automatically operated door for emitting infrared radiation into said predeterminate space;

an active infrared imaging device for imaging said predeterminate space on the predetermined side of the automatically operated door;

said active infrared imaging device imaging the at least one person present on said support surface within said predeterminate space by means of reflected infrared radiation originating from said at least one person present on said support surface within said predeterminate space;

a programmable evaluation and control unit operatively connected to said active infrared imaging device for controlling said automatically operated door in correspondence with the movement condition of said at least one person present on said support surface within said predeterminate space;

said active infrared imaging device constituting an infrared camera having a predetermined camera axis;

said infrared camera being arranges with said camera axis at a predetermined angle of inclination different from 90° relative to said support surface within said predeterminate space;

said infrared camera projecting at least one infrared reflection image of said predeterminate space; and said infrared camera imaging different zones of said predeterminate space and which zones extend substantially parallel to said support surface and said automatically operated door in a manner such that a zone, which is closer to said automatically operated door, is imaged at a larger scale than a zone which is more distant from said automatically operated door, and the imaging scale progressively increases with decreasing distance from said automatically operated door so that each zone situated closer to said automatically operated door is imaged at proportionally higher resolution as compared to an adjacent zone which is more distant from the automatically operated door.

18. An apparatus for controlling eh position of an automatically operated door as a function of the presence, number and movement condition of at least one person present on a support surface within a predeterminate space extending on a predetermined side of the automatically operated door, said apparatus comprising:

an infrared radiation source incorporated into the automatically operated door for emitting infrared radiation into said predeterminate space;

an active infrared imaging device for imaging said predeterminate space on the predetermined side of the automatically operated door;

said active infrared imaging device imaging the at least one person present on said support surface within said predeterminate space by means of reflected infrared radiation originating from said at least one person present on said support surface within said predeterminate space;

a programmable evaluation and control unit operatively connected to said active infrared imaging device for controlling said automatically operated door in correspondence with the movement condition of said at least one person present on said support surface within said predeterminate space;

said active infrared imaging device comprising an infrared camera projecting a plural number of consecutive infrared reflection images of said predeterminate space;

said infrared camera containing:

a liquid crystal display unit containing a liquid crystal display and an associated microshutter;

said microshutter possessing a plural number of microshutter columns arranged substantially parallel and adjacent to each other and defining a plural number of associated images columns at said liquid crystal display;

said plural number of microshutters being arranged adjacent each other in a first direction corresponding to a direction extending substantially parallel to said support surface and substantially parallel to said automatically operated door and extending in a second direction corresponding to a direction extending substantially parallel to said support surface and substantially perpendicular to said automatically operated door;

a linear image sensor constituting a charge-coupled device; and said linear image sensor extending in said second direction and substantially parallel to said liquid crystal display unit.

19. The apparatus as defined in claim 18, further including:

an optical system for imaging said plural number of image columns at said linear image sensor; and said microshutter columns being controlled by said programmable evaluation and controlled unit for sequentially imaging said plural number of associated image columns at said linear image sensor.

20. The apparatus as defined in claim 18, wherein:

said linear image sensor contains a predetermined number of sensor cells arranged in sequence in said second direction;

said predetermined number of sensor cells arranged in sequence in said second direction in said linear image sensor, being higher than said plural number of microshutter columns arranged adjacent each other in said first direction in said liquid crystal display unit; and said linear image sensor having a higher resolution in said second direction than each one of said plural number of imaging columns in said liquid crystal display unit.

21. The apparatus as defined in claim 18, wherein:

said programmable evaluation and control unit being operatively connected with said microshutter and said linear image sensor of said infrared camera;

said programmable evaluation and control unit sequentially operating said microshutter columns in order to sequentially image associated ones of said image columns at said linear image sensor and reading out said linear image sensor in order to form binary data representative of each infrared reflection image projected by said infrared camera;

said programmable evaluation and control unit containing storage means for storing said binary data representative of each infrared reflection image; and said programmable evaluation and control unit further containing comparator means for comparing the stored binary data with further binary data representative of further infrared reflection images in order to thereby compare the stored binary data and the further binary data with respect to a contour representative of the at least one person as well as with respect to temporal variations representative of the movement condition of the at least one person.

22. The apparatus as defined in claim 21, wherein:

said storage means and said comparator means of said programmable evaluation and control unit are programmed for comparing binary data representative of different infrared reflection images and thereby forming standard binary data representative of standard infrared reflection images; and said storage means and said comparator means being further programmed for updating said standard binary data by comparison with further binary data representative of further infrared reflection images and forming updated standard binary data representative of updated standard infrared reflection images.

23. An apparatus for controlling the position of an automatically operated door as a function of the presence, number and movement condition of at least one person present on a support surface within a predeterminate space extending on a predetermined side of the automatically operated door, said apparatus comprising:

an infrared radiation source incorporated into the automatically operated door for emitting infrared radiation into said predeterminate space;

an active infrared imaging device for imaging said predeterminate space on the predetermined side of the automatically operated door;

said active infrared imaging device imaging the at least one person present on said support surface within said predeterminate space by means of reflected infrared radiation originating from said at least one person present on said support surface within said predeterminate space;

a programmable evaluation and control unit operatively connected to said active infrared imaging device for controlling said automatically operated door in correspondence with the movement condition of said at least one person present on said support surface within said predeterminate space;

an optical imaging device for projecting at least one optical reflection image of said predeterminate space;

said optical imaging device and said infrared imaging device being alternatingly operated in order to alternatively project at least one optical reflection image and said at least ne infrared reflection image;

said programmable evaluation and control unit being operatively connected to said optical imaging device and said infrared imaging device for alternatingly generating binary data respectively representative of said at least one optical reflection image and said at least one infrared reflection image; and subtraction means of said programmable evaluation and control unit receiving said binary data and subtracting said binary data representative of said at least one optical reflection image from said binary data representative of said at least one infrared reflection image in order to thereby generate differential binary data representative of at least one differential reflection image.

24. The apparatus as defined in claim 21, further including:

a scanner of said programmable evaluation and control unit interconnecting said infrared camera with a first storage device of said storage means in said programmable evaluation and control unit;

said first storage device storing said further binary data of said further infrared reflection images read out from said linear image sensor of said infrared camera by means of said scanner;

a programmable storage device of said storage means in said programmable evaluation and control unit containing stored binary data representative of at least one infrared reflection image;

a first comparator of said comparator means in said programmable evaluation and control unit being operatively connected to said first storage device and said programmable storage device for comparing said further binary data and said stored binary data and generating a contour-related output signal indicative of the number of persons present on said support surface in said predeterminate space; and a first control signal generator of said programmable evaluation and control unit receiving said output signal generated by said first comparator for controlling the operation of said automatically operated door with respect to said number of persons present on said support surface within said predeterminate space.

25. The apparatus as defined in claim 21, further including:

a scanner of said programmable evaluation and control unit interconnecting said infrared camera with a first storage device of said storage means in said programmable evaluation and control unit;

said first storage device storing consecutive binary data of two consecutive infrared images sequentially read out from said linear image sensor of said infrared camera by means of said scanner;

subtracting means of said programmable evaluation and control unit connected to said first storage device for subtracting stored binary data representative of one of said two consecutive infrared reflection images from the stored binary data representative of an other one of said two consecutive infrared reflection images in order to obtain differential binary data representative of a differential infrared reflection image;

a programmable storage device of said storage means in said programmable evaluation and control unit containing stored threshold data representative of a predetermined threshold value of said differential binary data;

a second comparator of said comparator means in said programmable evaluation and control unit connected to said subtracting means and to said programmable storage device for determining excess differential binary data exceeding said predetermined threshold value;

a further storage device of said storage means in said programmable evaluation and control unit connected to said second comparator for storing said excess differential binary data;

said programmable storage device containing data representative of the movement condition of said at least one person present on said support surface within said predeterminate space; and a third comparator of said comparator means in said programmable evaluation and control unit connected to said further storage device and said programmable storage device for comparing said excess differential binary data and said data representative of said movement condition of said at least one person present on said support surface within said predeterminate space and generating an output signal indicative of said movement condition; and a second control signal generator of said programmable evaluation and control unit receiving said output signal generated by said third comparator for controlling the operation of said automatically operated door with respect to the movement condition of said at least one person present on said support surface within said predeterminate space.

26. The apparatus as defined in claim 25, wherein:

said first storage device constitutes a random access memory;

said subtracting means constituting a comparator;

said programmable storage device constitutes an erasable and programmable read-only memory; and said further storage device constitutes a first-in, first-out memory.

27. An apparatus for controlling the position of an automatically operated door as a function of the presence, number and movement condition of at least one person present on a support surface within a predeterminate space extending on a predetermined side of the automatically operated door, said apparatus comprising:

an infrared radiation source incorporated into the automatically operated door for emitting infrared radiation into said predeterminate space;

an active infrared imaging device for imaging said predeterminate space on the predetermined side of the automatically operated door;

said active infrared imaging device imaging the at least one person present on said support surface within said predeterminate space by means of reflected infrared radiation originating from said at least one person present on said support surface within said predeterminate space;

a programmable evaluation and control unit operatively connected to said active infrared imaging device for controlling said automatically operated door in correspondence with the movement condition of said at least one person present on said support surface within said predeterminate space;

a programmable microprocessor operatively connected with said active infrared imaging device and said infrared radiation source;

said programmable microprocessor being programmed for controlling said infrared radiation source such as to emit infrared radiation into the predeterminate space;

said programmable microprocessor being programmed for controlling the active infrared imaging device for projecting infrared reflection images of said predeterminate space; and said programmable microprocessor being further programmable for scanning said projected infrared reflection images and processing data representative of said infrared reflection images for generating control signals for controlling said automatically operated door in correspondence with the movement condition of said at least one person present on said support surface within said predeterminate space.

28. An apparatus for controlling the position of an automatically operated door as a function of the presence, number and movement condition of at least one person present on a support surface within a predeterminate space extending on a predetermined side of the automatically operated door, said apparatus comprising:

a radiation source for emitting a radiation field limited vertical extent into said predeterminate space along and at a predeterminate height above the support surface within said predeterminate space extending on the predetermined side of the automatically operated door;

an active imaging device arranged on the predetermined side of the automatically operated door at a predeterminate height above said radiation field and directed at a predeterminate angle of inclination different from 90° to said radiation field;

said active imaging device imaging a predeterminate imaging region within said predeterminate space;

said active imaging device further imaging in the form of reflection images, at least part of the at least one person present within said predeterminate imaging region of said predeterminate space by means of reflected radiation reflected by at least said part of the at least one person present on said support surface within said predeterminate space;

a programmable evaluation and control unit operatively connected to said active imaging device for evaluating said reflection images produced by at least said part of said at least one person present on said support surface within said predeterminate space; and said programmable evaluation and control unit generating control signals for controlling the operation of the automatically operated door as a function of the presence, number and movement condition of the at least one person present on said support surface within said predeterminate space in response to the evaluation of the reflection images produced by said active imaging device.

* * * * *